March 8, 1949.    J. B. ROBINS ET AL    2,463,807
BEET SEEDER
Filed June 12, 1945    4 Sheets-Sheet 1
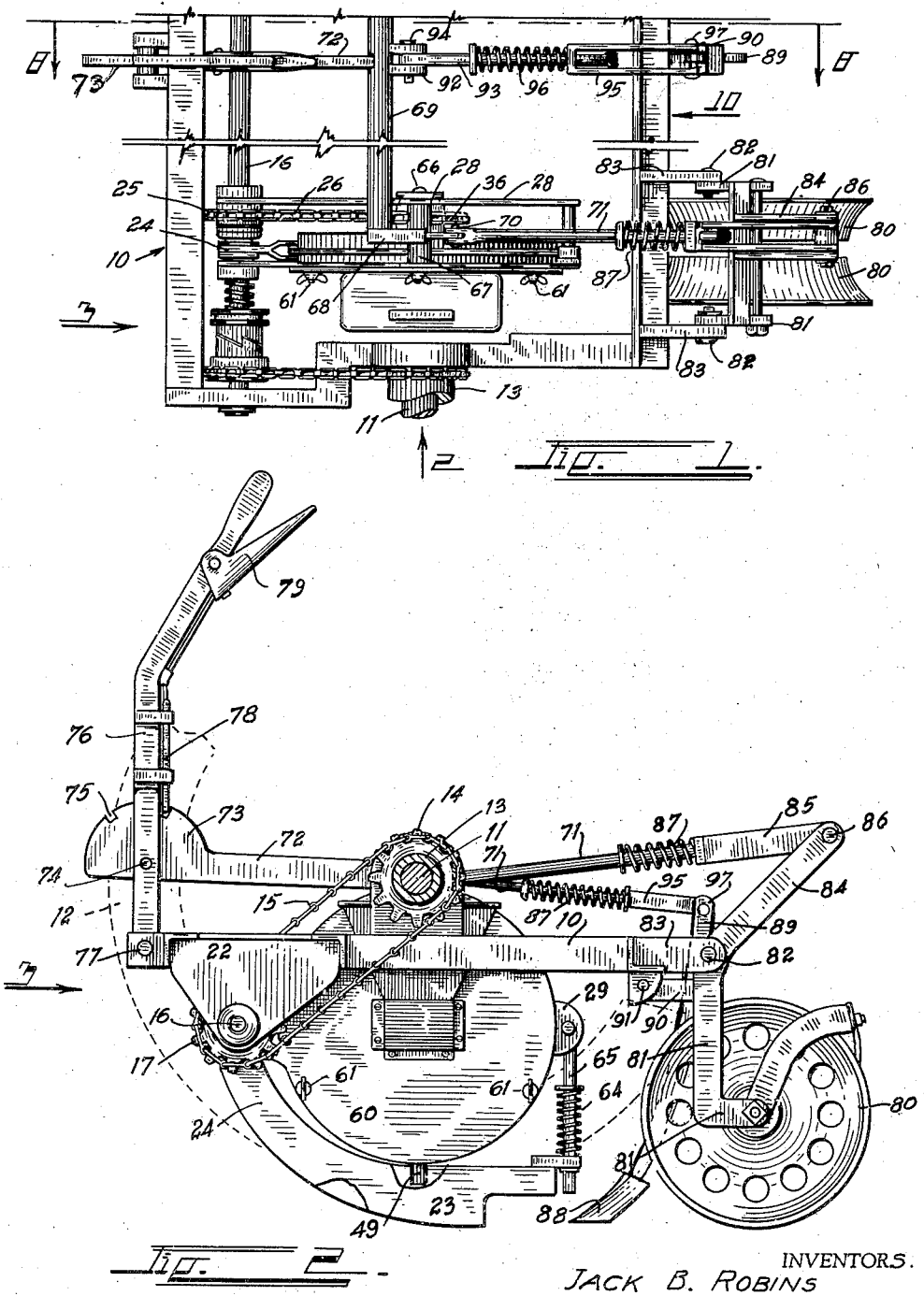
INVENTORS.
JACK B. ROBINS
BY JOSEPH K. ROSE
ATTORNEY.

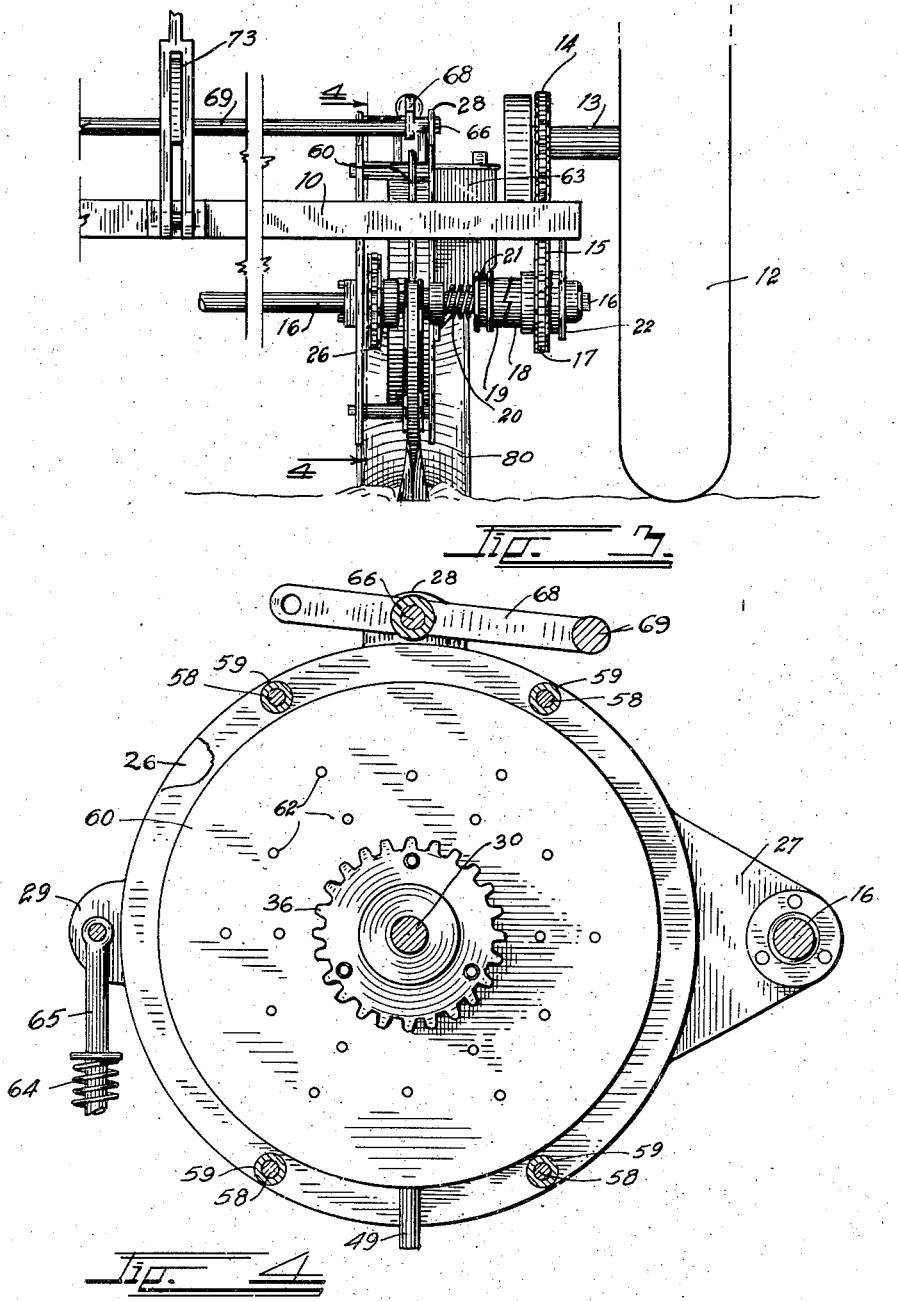

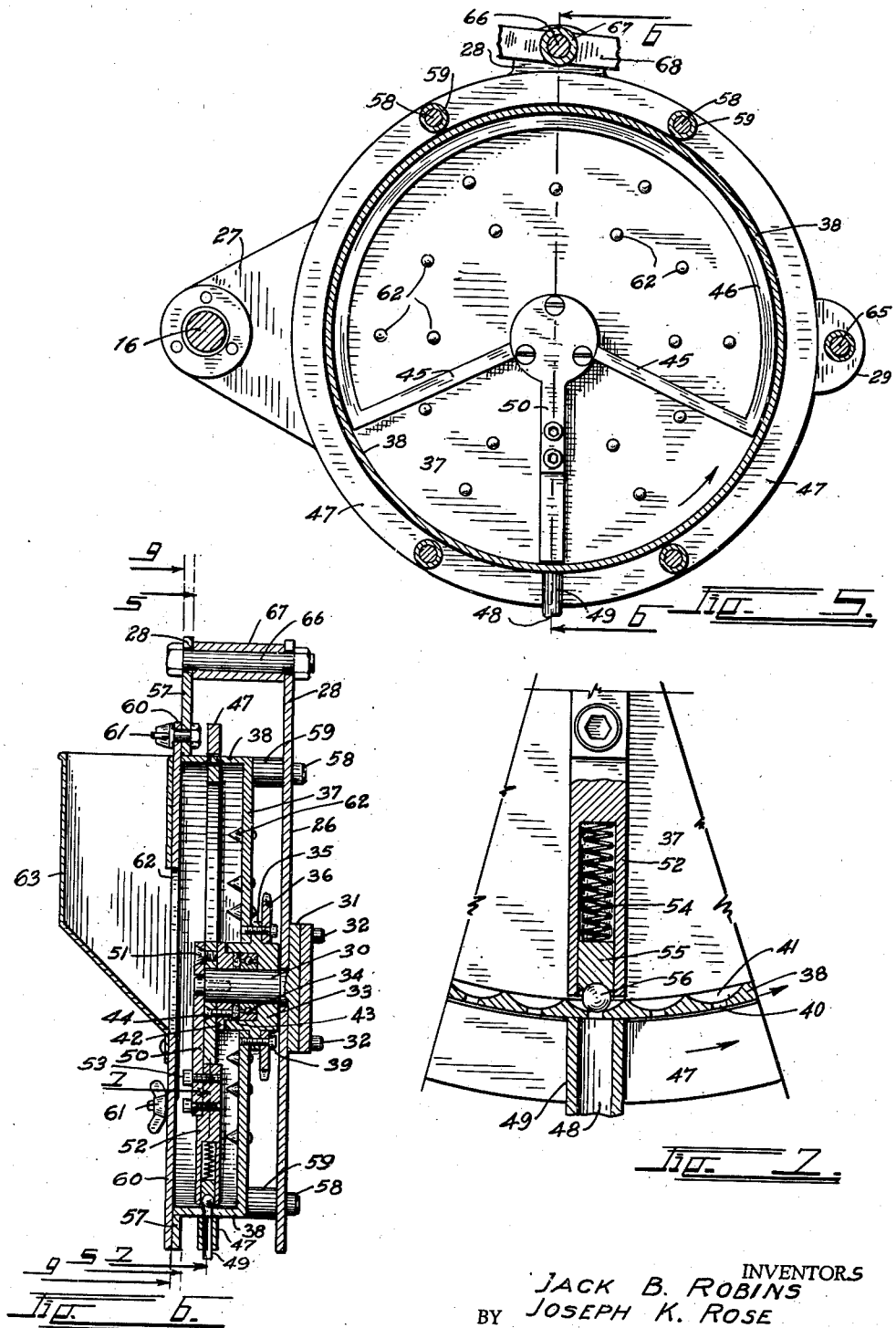

March 8, 1949.　　　　J. B. ROBINS ET AL　　　　2,463,807
BEET SEEDER

Filed June 12, 1945　　　　　　　　　　　　　　　4 Sheets-Sheet 4

INVENTORS.
JACK B. ROBINS
BY JOSEPH K. ROSE

Martin E. Anderson
ATTORNEY

UNITED STATES PATENT OFFICE 2,463,807

BEET SEEDER

Jack B. Robins and Joseph K. Rose,
Colorado Springs, Colo.

Application June 12, 1945, Serial No. 599,042

4 Claims. (Cl. 222—164)

This invention relates to improvements in beet seeders of the type employed in planting segmented sugar beet seed.

In the raising and cultivation of sugar beets, the practice has been recently adopted of breaking up the normal seed into segments, each of which contains a germ and then planting these seeds at predetermined spaced distances, varying from one to two inches.

Beet seeds are light and are of very irregular shape and cannot be satisfactorily handled by the ordinary seed dropping mechanism, such as have heretofore been employed in connection with the planting of corn and other seed. Where the seeds are to be spaced predetermined distances apart, it is necessary that they shall be released very close to the bottom of the seed bed, because, otherwise, they will be affected by air currents and the spacing will become highly irregular.

For the purpose of depositing seeds in predetermined spaced relation in seed beds, various mechanisms have been employed, some of which include belts provided with openings for the reception of the seed and which transport the seed from the selector mechanism to a position near the bottom of the seed bed.

It is the object of this invention to produce a beet seeder of a simple and substantial construction that shall be highly effective for depositing a single seed at a time and which shall be of such construction that no special mechanism will be necessary to transfer the seed from the selector to the seed bed.

Another object of this invention is to produce a seed selecting and ejecting mechanism of a very simple, yet highly substantial construction that can be readily applied to a seeder truck supported on either rubber-tired or metal wheels.

A further object of this invention is to produce a seed selector having a rotating drum which forms one side and the bottom of the seed compartment and which travels through a considerable arc while supporting the seeds and which is provided in its cylindrical wall with openings of such size that they can receive only one segmented seed each, at a time.

It is a further object to provide this mechanism with an ejector that will positively dislodge the seed from the selector when the opening in the wall of the latter comes to the lowermost position.

The above and any other objects that may become apparent as the description proceeds are attained by means of a construction and arrangement of parts that will now be described in detail, and for this purpose reference will be had to the accompanying drawings in which the invention has been illustrated in its present preferred embodiment, and in which:

Figure 1 is a top plan view of one end of a beet seeder showing the position of the seed selecting and ejecting mechanism in its relation to the other parts;

Figure 2 is a side elevation looking in the direction of arrow 2 in Figure 1;

Figure 3 is a front elevation looking in the direction of arrows 3, in Figures 1 and 2;

Figure 4 is a section taken on line 4—4, Figure 3;

Figure 5 is a section taken on line 5—5, Figure 6;

Figure 6 is a section taken on line 6—6, Figure 5;

Figure 7 is a section taken on line 7—7, Figure 6;

Figure 8 is a section taken on line 8—8, Figure 1; and

Figure 9 is a section taken on line 9—9, Figure 6.

In the drawing reference numeral 10 designates the frame of the planter and reference numeral 11 designates the axle on which the supporting or ground wheel 12 is journaled. The hub of the wheel has been designated by reference numeral 13 and this carries a sprocket wheel 14 that transmits power by means of sprocket chain 15 to the jack shaft 16 that is provided with a sprocket wheel 17 for receiving the chain 15. Sprocket wheel 17 has a tubular hub 18 that is rotatably mounted on the jack shaft and which cooperates with a ratchet member 19 that is slidably but nonrotatably connected with the jack shaft. A spring 20 urges ratchet member 19 into operative engagement with the hub 18. It will be observed that this is a one-way clutch and by providing a suitable lever that has forks engaging in groove 21, the ratchet member 19 can be moved into inoperative position, as, for example, when the planter is being transferred from place to place, all in a manner old in farm machinery.

It may be explained here that since the other end of the planter is provided with a selector and ejector mechanism exactly like the one shown in Figures 3 and 4, only one end of the planter has been illustrated. Jack shaft 16 is mounted in bearings 22 that are supported from the frame 10 in the manner shown in Figures 2 and 3. A furrow opener 23 comprises two spaced members that are upwardly curved, as shown in Figures 2 and 8, that have their front ends welded into a single piece as indicated by 24 in Figure 1. The end portion 24 has an opening for the reception of the jack shaft 16.

The jack shaft is also provided with a sprocket wheel 25 for driving the seed selecting and ejecting mechanism which will now be described.

Referring now more particularly to Figures 4, 5, 6 and 7 in which the seed selecting and ejecting mechanism has been illustrated, reference numeral 26 designates a plate which is substantially circular, but is provided with three lugs which have been designated by reference numerals 27, 28 and 29. Plate 26 has a central opening for the reception of the stationary spindle bolt 30 which is provided with a circular flange 31 and secured to plate 26 by means of tap screws or other equivalent means 32. An adaptor 33 is mounted for rotation on the stationary spindle bolt and is supported on the latter by means of an antifriction bearing 34. The adaptor has a circular flange 35. A sprocket wheel 36 is positioned against the other surface of flange 35. The circular bottom 37 of a seed selector drum whose cylindrical wall has been designated by reference numeral 38, is positioned against the inner surface of flange 35; the three members being clamped in operative position by means of bolts 39. The cylindrical wall 38 is provided with a plurality of openings 40 that are most clearly shown in Figure 7. Arcuate recesses 41 are milled in the inner surface of flange 38, one for each opening 40. Openings 40 are of such size that they will receive one segmented beet seed only and are too small to receive two seeds. Secured to the stationary spindle bolt 30 and held against rotation relative thereto is a ring 42 having a reduced section that telescopes with the opening in adaptor 33. Packing material 43 is positioned between the inner end of ring 42 and the antifriction bearing 34. Attached to ring 42 by means of screws 44 is a member comprising two radial arms 45 connected by an arcuate member 46 which serves the function of retaining the seeds in the openings 41 during a portion of the rotation of the seed drum and which will be referred to hereinafter as the inside seed retaining ring. A ring designated by reference numeral 47 surrounds the cylindrical flange 38 of the drum in the plane of openings 40 and forms the outer seed retaining ring. This fits the drum with a clearance of about a hundredth of an inch, but has an opening at the bottom which has been designated by reference numeral 48. A short section of pipe 49 is usually welded between the ends of the outer seed retaining ring in the manner shown in Figure 7. It will now be seen that when the drum rotates in a counterclockwise direction, when viewed as in Figure 5, any seeds contained therein and resting on the inner surface of flange 38 will have ample opportunity to fill the openings 40 and such seeds will be carried around to the opposite end of the inner seed ring and will finally be ejected by a mechanism that will now be described.

An arm 50 is fastened to the central portion of the inner seed ring by means of screws 51. Secured to the lower end of this arm is a tubular extension 52 that is held in place thereon by means of screws 53. The lower end of extension 52 has an opening in which is positioned a helical spring 54 and a plug 55 that forms the lower abutment for the spring. The outer end of plug 55 has a semi-spherical recess in which is positioned a ball 56. When the drum rotates, the ball will be reciprocated and follow the inner surface of the flange. When the parts get into the position shown in Figure 7, any seed that may be in the corresponding opening 40 will be pushed out by the action of the ball. Such seeds will drop through the pipe 49 into position between the two sides of the furrow opener.

A plate 57 is provided with a central opening and surrounds the seed drum in the manner shown in Figures 6 and 9 and is secured to plate 26 and ring 47 by means of bolts 58 and spacers 59. The bolts pass through openings in the outer seed ring 47 and openings in plates 26 and 57. A cover plate 60 is secured to plate 57 by means of bolts 61 of which three have been shown. Plate 60 has an opening 62 which communicates with the interior of seed hopper 63 and therefore when seed is placed in hopper 63, it will flow through opening 62 into the space between the lower portion of flange 38 and the radial arms 45 of the inner seed ring, as shown in Figure 5. In the above description it has been explained how motion is transmitted from hubs 13 to sprocket wheel 36 and therefore whenever hub 13 rotates, sprocket wheel 36 and the seed drum will also rotate in the same direction or counterclockwise when viewed as in Figure 5.

Let us now assume that the seed selector is provided with segmented beet seed and that it is rotating in a counterclockwise direction when viewed as in Figure 5 and 7, such seeds will fill depressions 41 and a single seed will enter opening 40 and be ejected by ball 56 when the corresponding openings are in alignment with the opening 48 in pipe 49. The drive mechanism is designed so that the gear ratio will rotate the drum the angular distance between the adjacent holes 40 when the planter moves the distance that the seeds are to spaced which, for this purpose, may be considered as two inches.

When the planter is in operation the parts are in a position substantially like that shown in Figure 2. Spring 64 that encircles guide rod 65 urges the furrow opener downwardly into the soil. Pipe 49 can extend downwardly in the space between the two plates of the furrow opener, as far as desired and the seeds can therefore be released very close to the bottom of the seed furrow and in this manner the spacing will be accurate as the seed will not be affected by air currents.

When the planter is transported it is, of course, necessary to raise the furrow openers as well as other parts of the machine into a position like that shown in Figure 8 and for this purpose the following mechanism has been provided.

It has been pointed out above that there are two seed selector and ejector units spaced apart. In fact there may be more than two. The lugs 28 are perforated for the reception of pivot 66 on which is mounted a tubular hub 67. A short rocking beam 68 is welded to the hub 67 and extends forwardly and rearwardly therefrom. A bar 69 has its ends welded to the forward end of rocking beam 68 as shown in Figure 1. The rear end of the rocking beam is perforated for the reception of pivot 70 by means of which the telescoping link 71 is attached thereto. Bar 69 is, of course, similarly constructed and mounted at its other end. A lever 72 has its rear end welded to bar 69 and projects forwardly. The front end of lever 72 has an arcuate enlargement 73 whose peripheral edge is concentric with pivot 74 and is provided with at least two notches 75. A lever 76 has its lower end pivotally attached to the frame at 77 and is also connected with lever 72 by means of the pivot 74. Lever 76 has a detent mechanism comprising the pawl 78 and operating lever 79. It is evident that if lever 76 is rotated counterclockwise from the position shown in Figure 2, it will move lever 72 and bar 69 forwardly. Since bar 69 is attached to the seed selector mechanism by pivot 66, the latter will be forced to turn about the axis of jack shaft 16 and as a result the parts will move upwardly to the position shown in Figure 8 in which the planter parts are elevated above the surface of the ground.

Following the furrow opener is a furrow closer or presser wheel 80 that is mounted between the two fork members 81. The fork is pivoted at 82 to the rear ends of brackets 83. The fork has upwardly extending arms 84 to the ends of which the forked end member 85 of the extensible link 71 is attached by a pivot 86. A spring 87 serves to hold parts 71 and 85 in extended position and to exert a resilient downwardly acting force on wheel 80.

Since sugar beets are raised largely in localities where irrigation is practiced, it is desirable to provide a furrow between the rows for the irrigation water. A chisel shovel 88 is attached to the lower end of bar 89 which is adjustably mounted in a block 90 that is connected with the frame by a pivot 91. Bar 69 has two spaced ears 92, one on each side of a link 93 whose front end is pivotally connected therewith by a pivot 94. A forked link member 95 is slidably connected with link 93 and the two parts are urged into extended position by a spring 96. The rear ends of member 95 are pivoted to the upper end of bar 89 at 97. When bar 69 is moved forwardly or rearwardly by operation of lever 76, bar 89 and shovel 88 will be rocked about pivot 91, to raise it from the ground or lower it into operative position.

Having described the invention, what is claimed as new is:

1. A seed selector and ejector for beet seed planters, comprising, a plate having a stationary pivot, a drum having a circular bottom and a cylindrical wall mounted for rotation thereon, the wall having a plurality of angularly spaced openings, each opening having the capacity of containing a single segmented beet seed, an outer ring surrounding the drum in the plane of the openings, said ring having one opening positioned substantially at the lowest point of the drum, the openings in the drum successively registering with the opening in the ring as the drum rotates, means for attaching the ring to the plate for holding it stationary relative thereto, an inner seed ring carried by the pivot and nonrotatably secured thereto, the inner ring covering somewhat more than 180° of the cylindrical drum wall, serving to hold the seeds in the drum wall openings during a portion of the rotation of the drum, a seed ejector carried by the inner ring, said ejector having a spring pressed plunger engaging the inner surface of the drum wall in the plane of the openings, means comprising a plate for closing the open end of the drum, said plate having a seed hopper in communication with the inside of the drum, and means for rotating the drum about the pivot.

2. A seed planter comprising, a frame mounted between and supported by two ground wheels, a jack shaft journaled in the frame adjacent the front end thereof, means for connecting the shaft to at least one of the ground wheels for transmitting motion from the wheel to said shaft, said means including a one-way ratchet, a seed selector pivotally attached at its front end to the shaft, said selector comprising a plate having its front end provided with means for effecting a pivotal connection with the shaft, a pivot attached to the plate and projecting from one side thereof, a drum mounted for rotation on the pivot, the drum comprising a circular bottom and a cylindrical wall, means for rotating the drum from the jack shaft, a ring enclosing the cylindrical wall, the drum wall having a plurality of angularly spaced holes, each of a size to receive a single seed, means for attaching the ring to the plate and for holding it in the plane of the holes in the drum wall, said ring having an opening positioned to register successively with the holes in the drum wall as the drum rotates, an inner seed ring positioned inside of the drum, means for nonrotatably attaching the last mentioned ring to the pivot, said ring covering slightly more than 180° of the uppermost portion of the inner surface of the drum wall, means for closing the open end of the drum comprising a cover plate having an opening, means for connecting the last mentioned plate with the first mentioned plate, a seed hopper secured to the outer surface of the cover plate, the hopper being in communication with the interior through the opening in the cover plate, and an ejector mechanism for transferring seeds from the openings in the drum wall to the opening in the outer seed ring.

3. A seed planter in accordance with claim 2 in which means is provided for tilting the seed selector about its pivotal connection with the jack shaft.

4. A seed selector and ejector mechanism comprising, a stationary pivot spindle, a drum having a cylindrical wall, mounted for rotation on the spindle, the wall having a row of angularly spaced openings, a ring surrounding the drum in the plane of the openings, said ring having one opening positioned to successively register with the openings in the wall, an inner ring member positioned within the drum in the plane of the outer ring, means for rigidly securing the inner ring to the spindle, a bar secured to the pivot spindle and extending therefrom in the direction of the radius passing through the opening in the outer ring, and a spring pressed plunger in the outer end of the bar, resting on the inner surface of the drum wall forming means for ejecting a seed from the opening.

JACK B. ROBINS.
JOSEPH K. ROSE.

REFERENCES CITED

The following references are of record in the file of this patent:

UNITED STATES PATENTS

| Number | Name | Date |
|---|---|---|
| 296,980 | Lindsay | Apr. 15, 1884 |
| 343,286 | White et al. | June 8, 1886 |
| 471,884 | Nicholson | Mar. 29, 1892 |
| 1,400,738 | Kehr | Dec. 20, 1921 |
| 1,810,671 | Matheson | June 16, 1931 |
| 2,379,724 | Lanham | July 3, 1945 |
| 2,440,846 | Cannon | May 4, 1948 |

FOREIGN PATENTS

| Number | Country | Date |
|---|---|---|
| 101,052 | Austria | Sept. 25, 1925 |